Oct. 28, 1969 P. V. SARLUND 3,475,547

SUBSCRIPTION TELEVISION RECEIVER WITH PROGRAM USE RECORDING

Filed June 30, 1965 6 Sheets-Sheet 1

INVENTOR.
Pentti V. Sarlund
BY James E. Tracy
Attorney

SUBSCRIPTION TELEVISION RECEIVER WITH PROGRAM USE RECORDING

Filed June 30, 1965 6 Sheets-Sheet 2

INVENTOR.

Pentti V. Sarlund

BY

James E. Tracy

Attorney

SUBSCRIPTION TELEVISION RECEIVER WITH PROGRAM USE RECORDING

Filed June 30, 1965 6 Sheets-Sheet 3

INVENTOR.
Pentti V. Sarlund
BY
James E. Tracy
Attorney

Oct. 28, 1969 P. V. SARLUND 3,475,547

SUBSCRIPTION TELEVISION RECEIVER WITH PROGRAM USE RECORDING

Filed June 30, 1965 6 Sheets-Sheet 4

INVENTOR.
Pentti V. Sarlund
BY
James E. Tracy
Attorney

SUBSCRIPTION TELEVISION RECEIVER WITH PROGRAM USE RECORDING

Filed June 30, 1965 6 Sheets-Sheet 5

INVENTOR.
Pentti V. Sarlund
BY
James E. Tracy
Attorney

INVENTOR.
Pentti V. Sarlund
BY
James E. Tracy
Attorney

United States Patent Office 3,475,547
Patented Oct. 28, 1969

3,475,547
SUBSCRIPTION TELEVISION RECEIVER WITH PROGRAM USE RECORDING

Pentti V. Sarlund, Chicago, Ill., assignor to Zenith Radio Corporation, Chicago, Ill., a corporation of Delaware Filed June 30, 1965, Ser. No. 468,486
Int. Cl. H04n *1/44*
U.S. Cl. 178—5.1 15 Claims

ABSTRACT OF THE DISCLOSURE

The disclosed subscription receiver includes a recording arrangement for registering separate charges on a removable element, such as a card, only for those selected programs to which the subscriber actually subscribes. Each recorded charge takes the form of a pattern of one or more perforations, the location of the pattern indicating program identification while the make-up of the pattern represents in binary notation a charge sequence number that changes from one program to the next. A break in the sequence of recorded numbers reveals illicit use of the decoding equipment.

Figure 1:
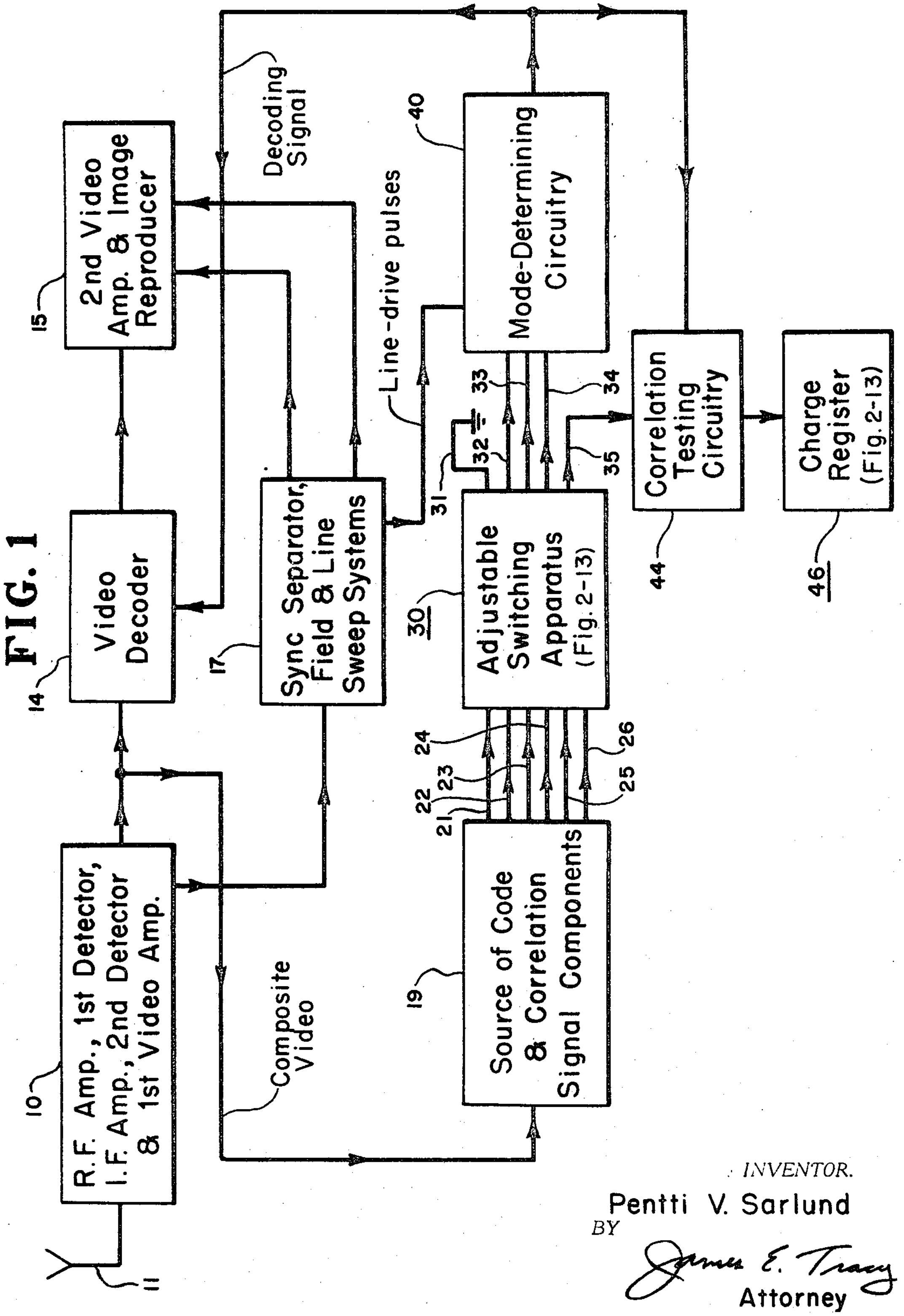

This invention relates to a subscription television receiver to which is transmitted television signals for a multiplicity of different programs. More particularly, it pertains to a charge recording arrangement by means of which charges are registered on a removable element only for those selected programs to which the subscriber actually subscribes.

Charge recording apparatus for a subscription television receiver have already been developed in which separate program charges are registered on a recording medium that may be removed from the receiver. The removable element may contain all charges for a month, week or any convenient period. In one prior system, charge or use recording is achieved by punching a separate aperture in a removable strip or card for each program, the locations of the punched perforations being determined by, and therefore representing the identity of, the particular programs viewed. The punched card is returned to the subscription television operating company and a bill is prepared in an amount based on the charge information represented by the perforations.

In another previous subscription television receiver, charges are registered on a tape by erasing portions of a pre-recorded track extending along the length of the tape. The positions of the erased sections indicate the specific programs to which the subscriber has subscribed.

While these prior systems do adequately make a permanent record of program usage for each subscriber, it may be desirable to register information which not only represents program identification but also the number of subscription programs that have been viewed as evidenced by the number of times the decoder of the receiver has been used. If the use record takes the form of a number sequence, a break in the sequence of numbers appearing on a single charge record or as recorded on a succession of such records reveals to the subscription operator a malfunctioning of the recording mechanism or an illicit use of the decoder. This most valuable information is not made available to the subscription operator by charge recording devices of the prior art.

The present invention overcomes this deficiency of prior arrangements by providing in the subscriber's receiver a sequence counter which advances one unit each time the decoding equipment is used to receive a subscription program. The charge record made out in the receiver reflects the count register and any break in the recorded count sequence is easily detected by the operating company through inspection of the charge records.

It is therefore an object of the present invention to provide a new and improved subscription television receiver.

It is an other object to provide a novel recording apparatus for a subscription television receiver.

A subscription television receiver, consrtucted in accordance with one aspect of the invention, comprises means for recording on a removable element separate charges each representing a charge sequence number and identifying a particular one of the selected programs to which the subscriber actually subscribes. Means are provided for changing the charge sequence number from one of the selected programs to the next in order to record program identification and also charge sequence.

The features of this invention which are believed to be new are set forth with particularity in the appended claims. The invention, together with further objects and advantages thereof, may best be understood, however, by reference to the following description in conjunction with the accompanying drawings in which:

FIGURE 1 schematically illustrates in block diagram form a subscription television receiver which embodies the invention;

FIGURES 2–13 are various detailed views of portions of the receiver of FIGURE 1 and illustrate one embodiment of the invention; and FIGURES 14–17 depict modifications of the apparatus of FIGURES 2–13 and illustrate additional embodiments of the invention.

A subscription television transmitter for producing a coded television signal of the type to be utilized by the receiver of FIGURE 1 is shown in detail in copending patent application Ser. No. 169,812, filed Jan. 30, 1962, in the name of George V. Morris, and issued Apr. 5, 1966 as patent 3,244,806, and assigned to the present assignee.

Reference is made to the Morris case for details of the transmitter. Very briefly, in the transmitter the video signal is coded, that is to say, switched at random from one mode in which the video is delayed with respect to sync to another mode wherein video is transmitted normally or without delay. The mode changes in response to the amplitude variations of a rectangular shaped coding signal developed by mode-determining circuitry and the instants at which the amplitude changes and, therefore, the mode changes occur are determined in part by the particular adjustment of an adjustable switching apparatus. That apparatus serves to permutably apply a series of random code signal components to a plurality of input circuits of the mode-determining circuitry and a different adjustment preferably will be employed for each subscription telecast or program to the end that each program is characterized by a unique coding schedule.

The receiver, shown schematically in FIGURE 1, is illustrated in detail in the aforesaid Morris application and reference may be made thereto for a more thorough explanation. FIGURE 1 is adequate, however, to understand the manner is which the charging apparatus of the present invention functions in conjunction with a subscription television receiver.

In FIGURE 1, a cascaded arrangement of a radio frequency amplifier, a first detector or oscillator-mixer, an intermediate frequency amplifier of one or more stages, a second or video detector, and a first video amplifier is represented in a single block 10 haivng input terminals connected to a receiving antenna 11 and output terminals coupled through a video decoder 14 to input terminals of a second video amplifier which, in turn, is connected to the input of an image-reproducing device or picture tube. For convenience, the second video amplifier and image reproducer are represented in a single block 15. Video decoder 14 may be identical in construction to the video coder employed in the transmitter and includes a time delay network and an electronic switch having two operating conditions. In one condition, the delay network is interposed in the video channel to delay the video with respect to the sync information, and in the other condition the delay network is removed from the video channel so that the video is translated through the decoder without the introduction of any significant time delay.

An output of the first video amplifier in block 10 is coupled to a synchronizing signal separator which energizes the usual field-sweep and line-sweep systems that are connected, in turn, to the deflection elements associated with the picture tube in block 15. For convenience, the sync separator, and the field- and line-sweep systems have been shown by a single block 17.

The audio circuitry of the receiver has not been shown in FIGURE 1 since that circuitry is not necessary to illustrate the operation of the present invention.

The random code signal components referred to above, developed in the transmitter and employed to code the video signal, take the form of signal bursts occurring during vertical retrace and exhibiting at random any one of five different frequencies from a group of six frequencies designated $f_1$–$f_6$. The sixth frequency of the group is used for correlation testing, a concept to be briefly described subsequently. It should be noted in passing that the frequency assigned to correlation testing may change from one program to the next. In order to control the decoding apparatus at the receiver the code signal bursts as well as the correlation signal bursts are added to the composite video signal in the transmitter during the vertical-retrace intervals. Separating, filtering and rectifying circuitry, shown by block 19, has an input coupled to the output of the first video amplifier in block 10 and produces from the composite video signal during each field-retrace interval rectified bursts of frequencies $f_1$–$f_6$ on respective ones of six different output conductors 21–26.

The six output conductors 21–26 are respectively connected to six input terminals of an adjustable code-determining switching apparatus or permutation device 30 which has a series of five output conductors 31–35. Switching apparatus 30 corresponds in function to a switching apparatus of the transmitter and establishes different prescribed ones of a multiplicity of interconnection patterns between input conductors 21–26 and output conductors 31–35. Structurally the apparatus may comprise a family of switches the adjustment of which selects the desired permutation pattern between input and output conductors for a given program interval. A preferred form of switch is shown in detail in FIGURES 2–13, to be described hereinafter. The transmitter switching apparatus may be identical.

Switching apparatus 30 permutes the applied code signal bursts as required before they are used for decoding the video signal and generally it will have to be adjusted differently for each subscription program to be viewed.

It will be observed that output conductor 31 of switching apparatus 30 is connected to ground; hence, any code signal components emerging on output 31 are eliminated and serve no function. Output conductors 32–34, on the other hand, are connected to respective ones of a series of three input circuits of a unit 40 referred to as the mode-determining circuitry and which corresponds in construction to the transmitter mode-determining circuitry. Unit 40 has another input circuit connected to the line-sweep system of block 17 to receive line-drive pulses thereover and it further includes a counting mechanism provided by a 7:1 blocking oscillator having an output connected to a bi-stable multivibrator. The blocking oscillator is driven by the line-drive pulses and the output of the multivibrator is connected to the electronic switch in video decoder 14. Mode-determining circuitry 40, in response to the line-drive pulses, produces for application to the video decoder a control or decoding signal of rectangular wave shape having an amplitude change occurring after every seven line traces. Since the code signal components applied to unit 40 via conductors 32–34 occur at random during each field-retrace interval, the periodic actuation of the mode-determining circuitry under the influence of line-drive pulses is interrupted during each vertical retrace by these code signal components. The effect of the code signal components is to determine the phase of the decoding signal during vertical retrace.

A correlation testing arrangement is provided to effectively examine the instantaneous adjustment of apparatus 30 and determine if it is correctly adjusted for any given program. Specifically, output conductor 35 of switching apparatus 30 is connected to one input of a unit 44 referred to as the correlation testing circuitry. Another input of unit 44 connects to the output terminal of mode-determining circuitry 40. As mentioned previously, for any given program one of the available code frequencies $f_1$–$f_6$ is selected at the transmitter for correlation testing. For convenience, it will be assumed that code signal bursts of frequency $f_5$ are chosen for that purpose. If the setting of switching apparatus 30 agrees with the setting of the corresponding switching apparatus at the transmitter, the code signal bursts of frequency $f_5$ will be applied to correlation testing circuitry 44. Unit 44 includes a comparator, such as a gate circuit, to which is supplied the correlation code signal components from switching apparatus 30, and from mode-determining circuitry 40 a locally-generated comparison signal which represents the actual setting of the switching apparatus 30.

To explain, one correlation code signal component of frequency $f_5$ occurs at the transmitter during each field-retrace interval and at a time when the bi-stable multivibrator in the transmitter mode-determining circuitry is established in a predetermined one of its two conditions. As a consequence, the correlation code signal components represent the setting of the adjustable switching apparatus of the transmitter and they are transmitted to the subscriber receivers for comparison purposes to check the adjustment of the switching apparatus at each receiver. Since the waveshape of the decoding signal produced by the receiver mode determining circuitry 40 is influenced by switching apparatus 30, that waveshape represents the instantaneous setting of the switching apparatus. Correlation testing circuitry 44 compares the waveshape of the decoding signal with the series of correlation code signal components received from the transmitter. If the receiver switching apparatus is properly set up, the timing of the correlation code signal components will exhibit a predetermined relation with respect to the rectangular waveshape of the decoding signal and provide an indication of correct correlation.

More specifically, for a properly adjusted receiver there will be developed, at the output of the comparator in correlation testing circuitry 44, one pulse during each field-retrace interval. When there is an uninterrupted series of these pulses throughout a ten-second testing interval, a control effect is produced which confirms a correct setting of adjustable switching apparatus 30. This is achieved in the aforesaid Morris case by means of a mechanical timing device which, in response to the uninterrupted series of pulses, closes a set of switch contacts.

An output of testing circuitry 44 is connected to a charge register 46 to effect actuation thereof when correct correlation has been confirmed. To elucidate, the switch contacts controlled by the timing device are included in the energizing circuit for a charge solenoid which forms a part of charge register 46. When correct correlation exists between the setting of switching apparatus 30 and the setting of the counterpart switching apparatus at the transmitter, the switch contacts controlled by the timing mechanism are closed to complete the energizing circuit for the charge solenoid. The charge register in Morris prints a charge on a paper billing tape and its solenoid is therefore referred to as a print solenoid. The manner of making, and the nature of, the recorded charges is the subject of the present invention and will be described in connection with FIGURES 2–17.

Preliminarily, a brief review will be given of the operation of the receiver of FIGURE 1. A television signal, which has been coded at the transmitter by delaying certain time segments of video information, is intercepted by antenna 11, amplified in the radio frequency amplifier and heterodyned to the selected intermediate frequency of the receiver in the first detector. The intermediate frequency signal is amplified in the intermediate frequency amplifier and detected in the second detector to produce a coded composite video signal which is then amplified in the first video amplifier. The amplified video is translated through the cascade arrangement of video decoder 14 and the second video amplifier to the input electrodes of the picture tube in unit 15 to control the intensity of the cathode ray beam thereof in conventional manner. The sweep systems in unit 17 are controlled in conventional manner by the synchronizing signal separator.

Unit 19 separates and rectifies the random code and correlation signal components from the composite video signal and applies these components to input conductors 21–26 of switching apparatus 30, the particular adjustment of which determines the permutation routing of those components to output conductors 31–35. Assuming that switching apparatus 30 in the receiver effects the same permutation as the counterpart switching apparatus in the transmitter, the correct code components will be channeled to the bi-stable multivibrator in mode-determining circuitry 40. That multivibrator, which is periodically actuated by the output of the line-drive pulse driven 7:1 blocking oscillator, is triggered by the random code signal components in exact synchronism with the actuation of the corresponding multivibrator in the transmitter.

The rectangular shaped decoding signal, produced in the output of the receiver mode-determining circuitry, thus has a waveform which is identical to that of the coding signal in the transmitter. The electronic switch in decoder 14 will therefore be actuated by the decoding signal in time synchronism with the counterpart electronic switch in the transmitter code which is necessary to decode the received signal.

Since the receiver switching apparatus is properly set up, the correlation code signal components of frequency $f_5$ applied to correlation testing circuitry 44 will exhibit the required relationship with respect to the waveform of the decoding signal developed by unit 40 and applied to unit 44. A control effect, in the form of closing of switch contacts to complete the energizing circuit for the charge solenoid in charge register 46, will thus be produced with the result that the solenoid will be actuated to effect registration of a charge in the manner to be described.

Figure 2:
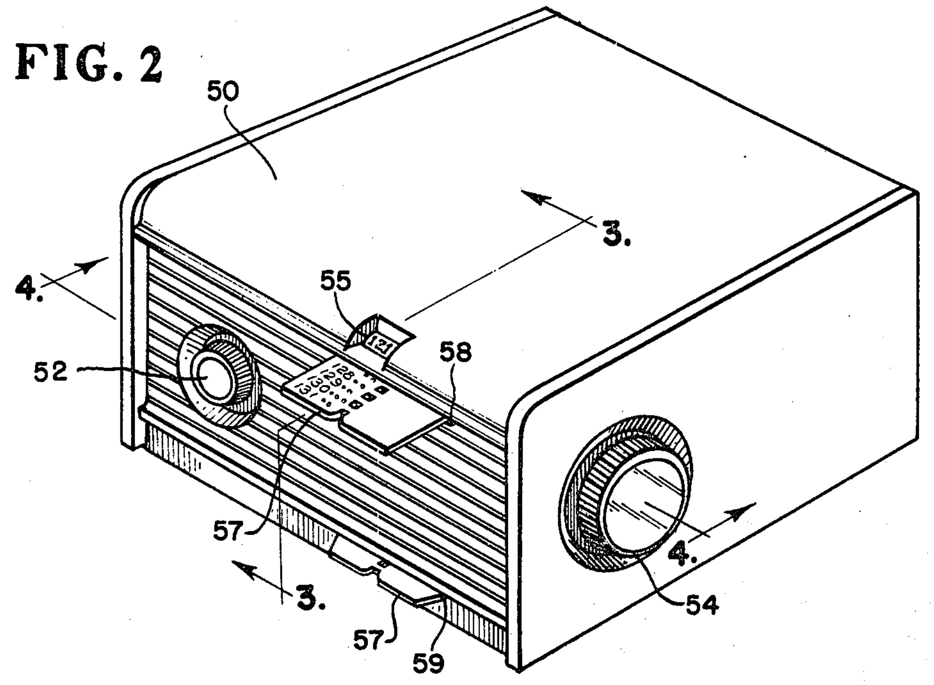

Directing attention to the embodiment of FIGURES 2–13, and particularly to FIGURE 2, all of the circuitry and equipment required to convert a conventional television receiver to a subscription television receiver is housed within a metal cabinet 50. Preferably, cabinet 50 is mounted on top of or in close proximity to the television receiver and a cable (not shown) provides the necessary circuit connections therebetween.

Figure 3:
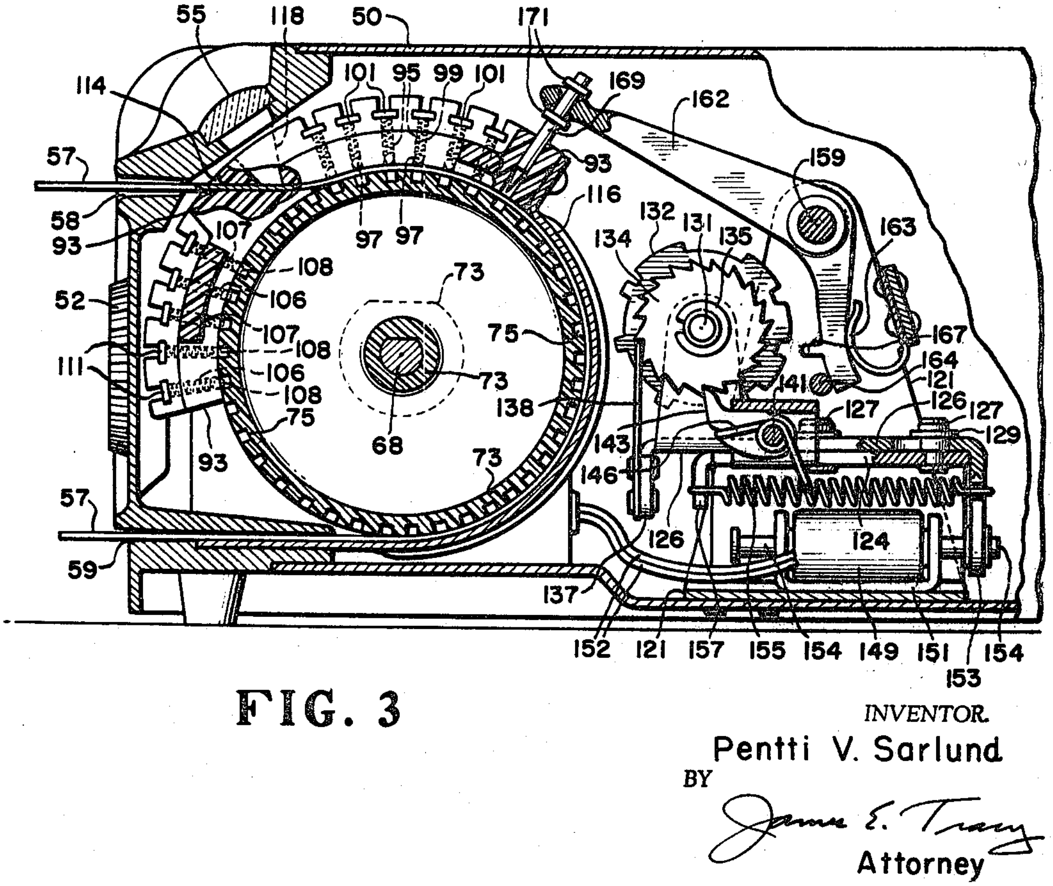
Figure 4:
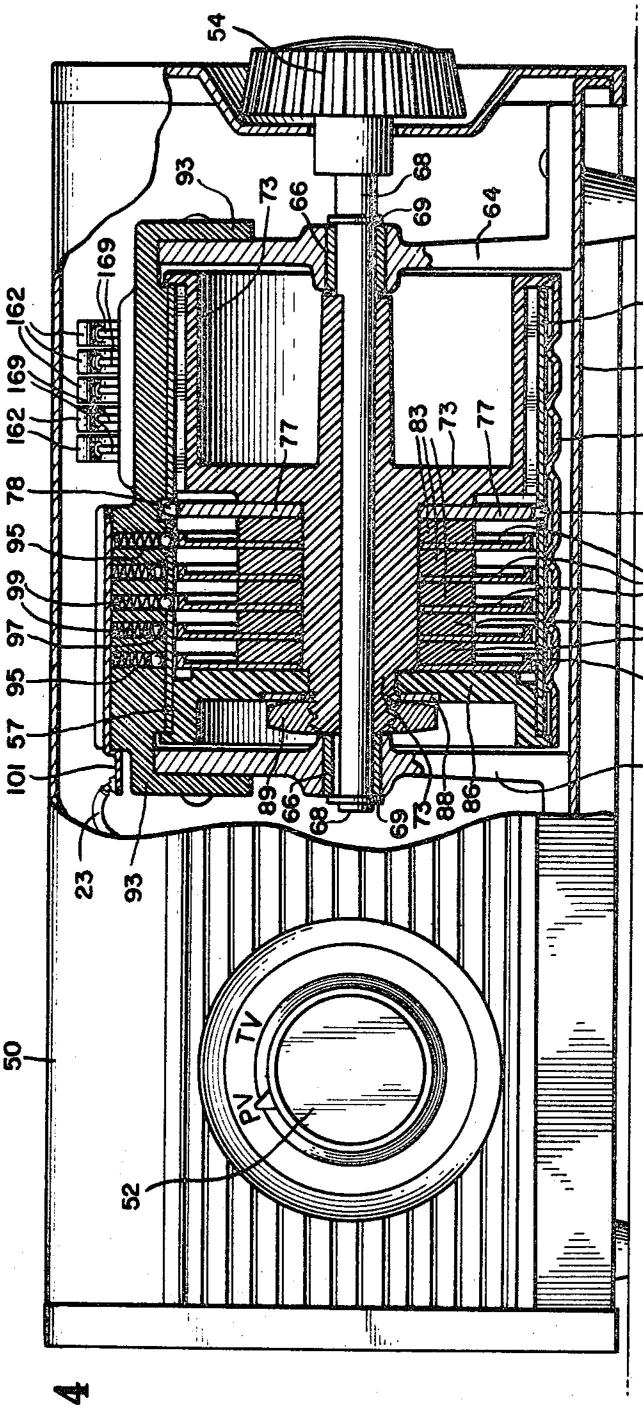
Figure 7:
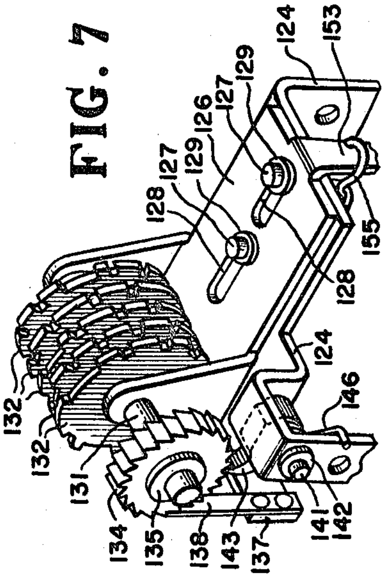

A control knob 52, see especially FIGURES 2 and 4, positioned on the front of cabinet 50 is connected to an operating shaft (not shown) which operates a PV–TV switch. Knob 52 is to manipulated by the subscriber to the PV position for the reception of a subscription television program and to TV when the decoding apparatus is to be effectively disassociated from the television receiver. The indicia PV is a shorthand designation of the assignee's "Phonevision" subscription television system. Positioned on the side of cabinet 50 exposed in FIGURE 2 is a manual control knob 54 which must be adjusted by the subscriber to establish switching apparatus 30 in the required condition of adjustment for any given program. Cabinet 50 has a display window in the form of a magnifying viewing lens 55, see especially FIGURE 3.

Figures 5, 6, 8:
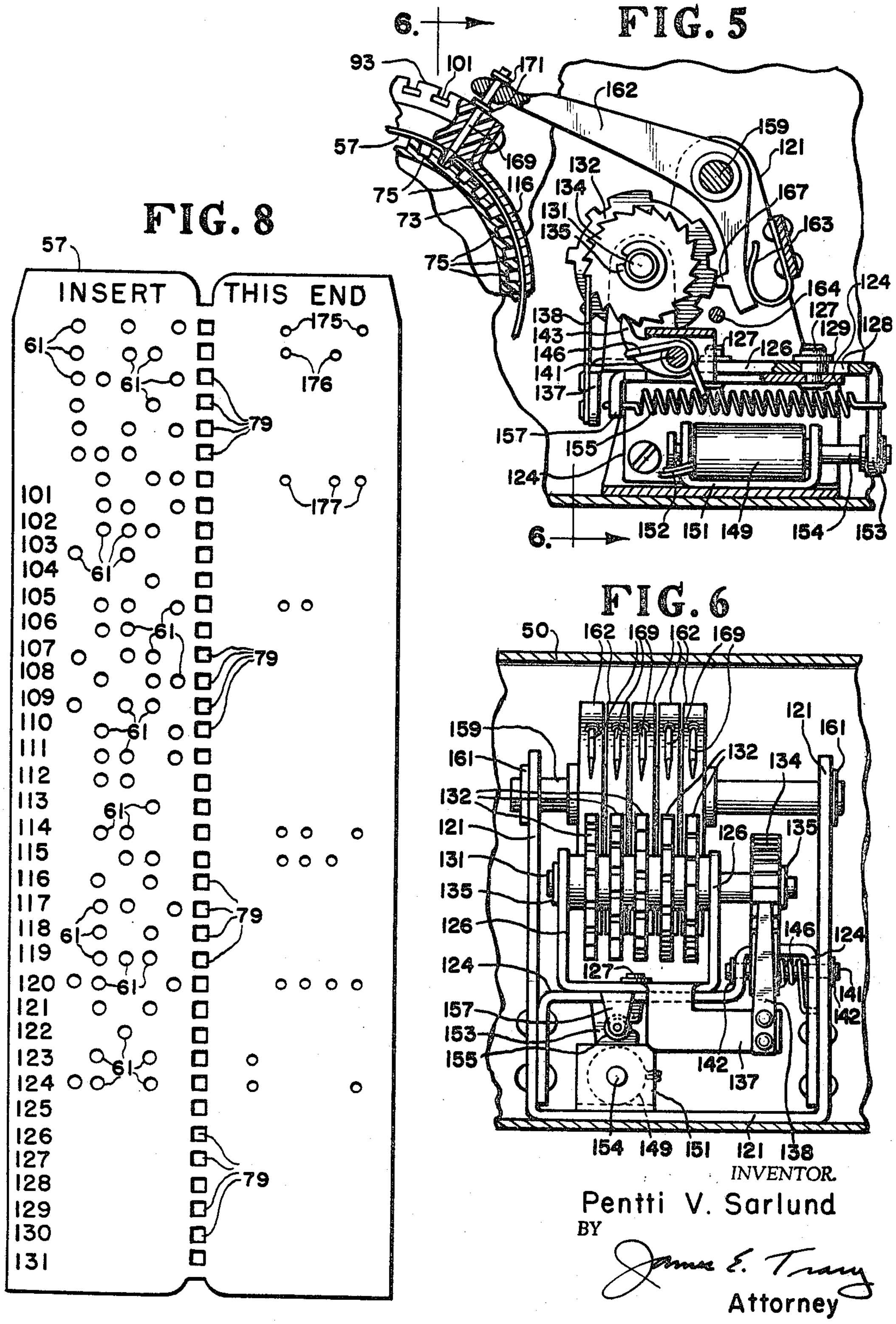

The establishment of different switching conditions to achieve different interconnection patterns between input conductors 21–26 and output conductors 31–35 of switching apparatus 30 is facilitated by a perforated, flexible insulating strip, such as a card 57 (see especially FIGURES 2, 3 and 8), which is threaded through sensing or reading equipment within cabinet 50, being fed into the cabinet through input slot 58 and emerging by way of exit slot 59. Perforated or punched card 57, which may be called a code-bearing element for reasons which will be apparent, has a series of thirty-one distinct operating positions with respect to the reading apparatus and, in a manner to be explained, is transported in step-by-step fashion from one position to the next by rotation of control knob 54. In each of the thirty-one different positions, a unique pattern of perforations 61, in the left half of strip 57 as viewed in FIGURE 8, is interposed between input switch or sensing contacts, connected to input conductors 21–26, and output switch or sensing contacts connected to output conductors 31–35. Each pattern of perforations permutably connects the input to the output switch contacts in accordance with a different interconnection pattern. The thirty-one different numbers (101–131) displayed or printed along the left margin of strip 57 (FIGURE 8) may be referred to as code numbers and are employed to facilitate the selection of the correct pattern of perforations required for each different program. For any given program, knob 54 is rotated by the subscriber until a prescribed one of the code numbers 101–131 on card 57 is exposed through window 55. As shown in FIGURE 2, the code number 121 is revealed and this indicates that the perforation pattern associated with that number is effective, namely is interposed between the input and output switch contacts.

Referring now to the details of the switching apparatus itself, cabinet 50 has a base 63 (see especially FIGURE 4) to which is rigidly mounted a pair of spaced-apart upright supports 64 and 65, which are parallel to each other as well as to the side walls of cabinet 50. The central portion of each of support members 64 and 65 is apertured and provided with a sleeve type bearing 66, the bearings being aligned and rigidly mounted to their associated support members. Journalled within bearings 66 is an operating shaft 68, the right end of which (as viewed in FIGURE 4) is rigidly affixed to transport knob 54. This may conveniently be achieved by providing the right end of shaft 68 with a flat and knob 54 with a D-shaped hole to receive the shaft. A pair of C-shaped retaining rings 69 are mounted in grooves of shaft 68 to captivate the shaft with respect to axial movement in support members 64 and 65. The grooves around shaft 68 which accommodate retaining rings 69 are visible in FIGURE 10 and are designated by the reference numerals 71.

Switching apparatus 30 includes a rotor or drum assembly (see especially FIGURES 4 and 10) which is rigidly mounted to shaft 68 between supports 64 and 65 and rotates in response to manipulation of knob 54. More specifically, the rotor assembly includes a core element 73, constructed of some appropriate insulating material such as plastic, that is fixedly connected to shaft 68 by the expedient of providing shaft 68 with a flat and the core with a channel, through which the shaft extends, of mating or complementary D-shaped cross section. This is best seen in the cross sectional view of FIGURE 11. The right half of core member 73 (as viewed in FIGURE 4) is hollowed out to reduce the weight of the drum assembly. The hollowed out portion thus essentially constitutes a cylindrical shaped section, the external surface of which is provided with a series of equally spaced grooves 75 (see especially FIGURES 10 and 12) that extend in a direction parallel to the axis of shaft 68. The purpose of grooves 75 will be explained later.

The left half of core 73 (as viewed in FIGURE 4) merely constitutes a base to provide a support for other elements of the rotor assembly. Initially, the left section of core 73 supports a metallic circular disc 77 which is apertured to fit over the core. Disc 77 is fixedly mounted and indexed to core 73 by the expedient of a flat on the core (see FIGURE 11) and a mating D-shaped configuration of the aperture in the disc. The entire circumference of metallic disc 77 is provided with a series of regularly spaced teeth 78 (see especially FIGURES 10 and 12) which constitute sprocket teeth of appropriate dimensions to be accommodated by regularly spaced sprocket holes 79 in removable card 57, see FIGURE 8. The expedient of providing disc 77 with an aperture that mates with the core 73 in only one relative position of the core and disc results in automatic indexing of the sprocket teeth 78 with respect to grooves 75 and to the other elements of the rotor assembly to be discussed as the rotor assembly is manufactured.

There is also rigidly mounted and indexed to the left section of core 73 a series of five parallel metallic electrically conductive discs or slip rings 81 which are spaced apart from each other and also from sprocket disc 77 by means of a series of five insulating spacers 83. Each of the five discs 81 and the five spacers 83 is provided with a D-shaped aperture which corresponds to the cross-sectional configuration of the left section of core 73 in order that all of those elements may be indexed with respect to sprocket disc 77.

The periphery of each disc 81 has a thickness approximately double that of the remainder of the disc, see FIGURE 4. The peripheries of discs 81 therefore effectively provide a series of five similarly shaped slip rings; hence discs 81 are also referred to as slip rings. Each ring is provided, around its entire circumference, with a series of equally spaced notches 84 (see especially FIGURES 10, 11 and 13), and slip rings 81 are so positioned with respect to each other that the notches of each ring are aligned with corresponding notches of the other rings and in a direction parallel to the axis of the rotor assembly. For reasons which will become apparent, slip rings 81 provide conductive bus bars.

To the left of discs 81 and 77 and spacers 83 (as viewed in FIGURE 4) is a retaining disc 86, constructed of insulating material such as plastic, which is apertured to fit over the left section of core 73. A metallic washer 88 and a nut 89 are provided to hold the various elements of the rotor assembly together. The extreme left end of core 73 is threaded to accommodate nut 89.

Figures 9, 13:
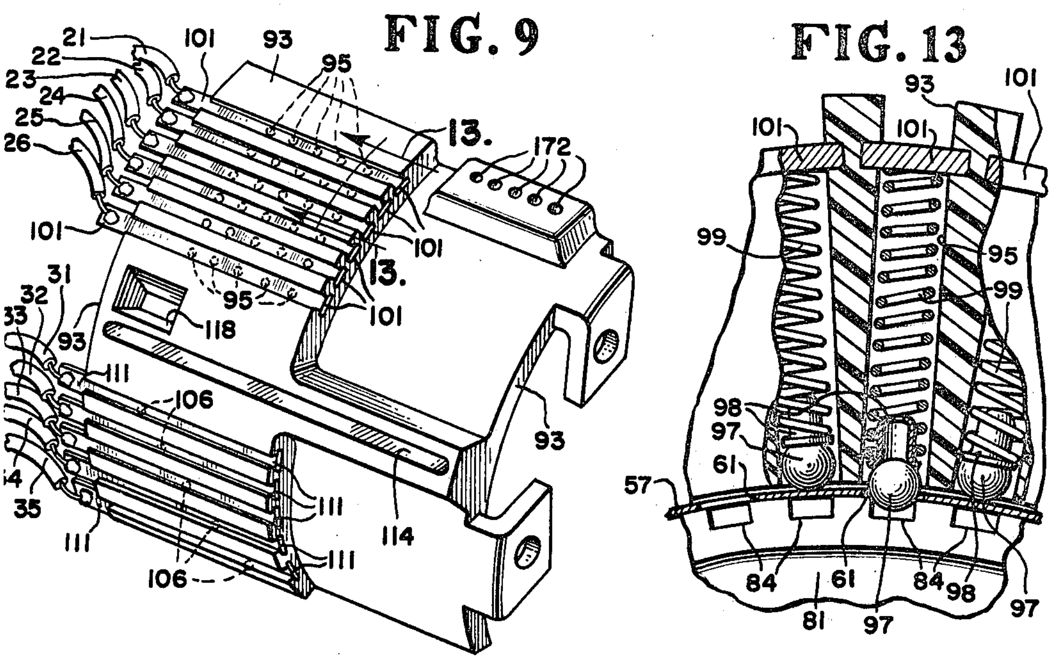
Figures 10, 11:
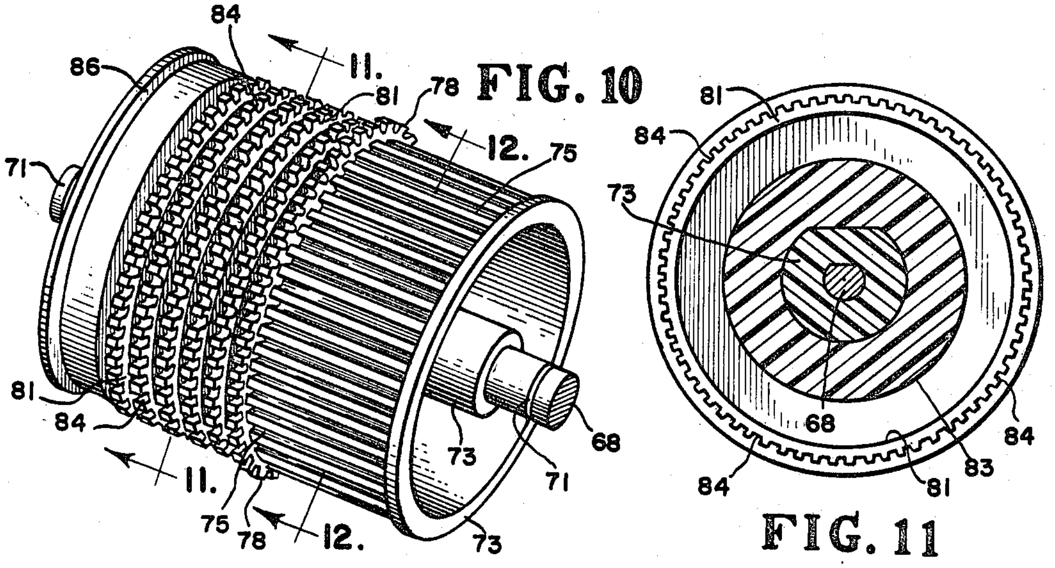
Figure 12:
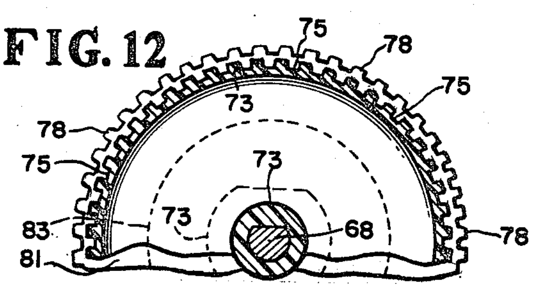

Adjustable switching apparatus 30 also includes a fixed stator assembly (shown by itself in FIGURE 9) which has a main support or base member 93, constructed of some suitable insulating material such as plastic, that is rigidly affixed to upright supports 64 and 65, see FIGURE 4. A series of thirty cylindrical shaped channels 95, arranged in rows and columns, five rows with six per row and six columns with five per column, as best seen in FIGURE 9 are formed in stator support 93. Each channel 95 extends throughout the entire thickness of stator support 93 in a direction perpendicular to the axis of the rotor assembly, as best seen in FIGURES 3, 4 and 13. The six aligned channels 95 of each row extend along an arc of the stator assembly, and the five aligned channels 95 of each column extend along a straight line parallel to the axis of the rotor assembly. The channels are so dimensioned and positioned that the distance between centers of adjacent channels in each row equals the distance between centers of adjacent notches 84 in each of slip rings 81, as best seen in FIGURE 13. The five rows of channels 95 are also positioned so that each row extends along or lines up with a respective assigned one of the slip rings.

The rotor assembly may be provided with a detent device (not shown) which insures that the rotor assumes distinct and predetermined indexed positions when it is rotated in response to rotation of knob 54. Each of these positions would be indexed with respect to channels 95 in order that the channels will register or be in juxtaposition with respective ones of notches 84 (see FIGURE 13) in every discrete position of the rotor assembly.

Each channel 95 contains, at its end closest to the rotor assembly, a metallic conductive floating bearing ball 97 on top of which is an inverted metallic eyelet or thimble 98, see FIGURE 13. An electrically conductive coil spring 99 is positioned on top of thimble 98 in each of the thirty channels 95. The bearing balls, eyelets and coil springs may all be suitably plated for maximum electrical conductivity. The five coil springs 99 contained in the five channels 95 forming each of the six columns are electrically connected to an assigned one of a group of conductive bus bars 101 rigidly affixed to stator support 93. In manufacturing the switching apparatus, each spring 99 is compressed so that a constant force is exerted against the associated bearing ball 97. In this way, each bearing ball is spring urged downward toward a notch 84 of one of slip rings 81.

The six bus bars 101 are respectively electrically connected, such as by soldering, to the six input conductors 21–26 of the switching apparatus. With this arrangement, each of input conductors 21–26 is electrically connected to an assigned group of five bearing balls 97.

Stator support 93 also includes a series of five cylindrical shaped channels 106 (see especially FIGURES 3 and 9) which extend therethrough in a direction perpendicular to the axis of the rotor assembly. Channels 106 are staggered and spaced so that they register with respective ones of the five strip rings 81. In other words, each of the five channels 106 lies on the same arc defined by a respective one of the five rows of channels 95. As in the case of channels 95, each channel 106 also includes a compressed coil spring 107 and a metallic conductive bearing ball 108, as shown in FIGURE 3. It is also contemplated that inverted eyelets or thimbles, similar to thimbles 98, will be positioned between springs 107 and bearing balls 108. Channels 106 are also positioned, with respect to channels 95, such that when channels 95 are in juxtaposition or register with respective notches 84 of slip rings 81 channels 106 will likewise register with respective ones of notches 84.

A series of five parallel metallic conductive bus bars 111, rigidly mounted to stator support 93, cover respective ones of the five openings 106 and extend in a direction parallel to the axis of the rotor assembly. The five coil springs 107 are electrically connected to respective ones of the five bus bars 111 and the output conductors 31–35 of adjustable switching apparatus 30 are electrically connected, such as by soldering, to respective ones of the five bus bars 111. With this arrangement, each of output conductors 31–35 is electrically connected to a respective one of the five bearing balls 108.

Input conductors 21–26 and bearing balls 97 are connected to slip rings 81 and thence to bearing balls 108 and output conductors 31-35 in accordance with different permutation or interconnection patterns by means of removable code card 57. Stator support 93 is provided with a slot 114 that registers with slot 58 of cabinet 50, see FIGURES 2, 3 and 9. The subscriber is obliged to insert code card 57 into slots 58 and 114 with the top edge of the card, as viewed in FIGURE 8, inserted first. Card 57 may be moved without opposition until it engages one of sprocket teeth. 78. Further movement of the card can be achieved only by clockwise rotation of knob 54, as viewed in FIGURE 2. The entire rotor assembly rotates and sprocket teeth 78 engage holes 79 of card 57 moving it in a direction toward the rear of cabinet 50. A guide member 116, preferably constructed of metal, is rigidly connected to stator support 93 and also to the bottom of cabinet 50 in order to hold card 57 in engagement with the sprocket teeth and to guide it in a semi-circular path with the result that the card emerges from cabinet 50 through exit slot 59.

As mentioned previously, it is contemplated that switching apparatus 30 must be adjusted differently for each different subscription program and card 57 is capable of effecting thirty-one different adjustments each of which is indicated by a respective one of the code numbers 101–131 printed along the left margin of the card. The different code numbers required to decode different subscription programs will be publicized, such as in program booklets, newspaper listings, etc. Advance publicity may also be given relative to the nature of and cost of each program. The subscriber must then initially ascertain the particular code number for a specified program in which he is interested. Stator support 93 also has an aperture 118 that registers or coincides with window 55 of cabinet 50 and both of these openings are positioned such that the thirty-one code numbers on code card 57 are exposed one at a time as the card is transported from one position to the next by rotation of knob 54.

The subscriber rotates knob 54 until the code number, assigned to the program he wishes to view, is exposed in window 55. Assume, for example that to decode a given subscription telecast code number 121 must be displayed in window 55, as shown in FIGURE 2. When that occurs a predetermined pattern of perforations 61 registers with bearing balls 97. The sprocket teeth 78 are also positioned with respect to perforations 61 such that the perforations will automatically register with assigned respective ones of notches 84 of slip rings 81. In this way, when a code number is centered within window 55 each of the effective perforations 61 will be interposed between and in juxtaposition with an assigned bearing ball 97 and an assigned notch 84.

Incidentally, it was mentioned previously that a detenting mechanism (not shown) may be incorporated in the switching apparatus to insure that the rotor assembly is rotated in steps to the end that notches 84 line up with the bearing balls. It will now be recognized that no detent apparatus is essential if the subscriber always makes certain that each specified code number is centered within window 55. Besides, detenting to some extent occurs by the action of the bearing balls benig forced into the notches. If the rotor assembly is not precisely positioned, the bearing balls will automatically seat in the notches and in so doing the rotor assembly is rotated slightly.

Since bearing balls 97 are spring urged toward slip rings 81, whenever a perforation 61 lies immediately beneath a bearing ball that ball is permitted to drop into the notch 84 which is in register with the bearing ball at the time, as shown by the second or middle bearing ball 97 in FIGURE 13. Of course, the diameter of each perforation 61 should exceed the width of each notch 84. Preferably, the diameter of each bearing ball 97 is also greater than the width of each notch 84. Moreover, each notch preferably is provided with two relatively sharp edges or corners so that when a bearing ball engages a notch, the engagement takes place at two knife-edge contacts. The associated coil spring 99 produces a relatively high contact force along the two knife-edge or line contacts. In this way, the possibility of a faulty electrical connection between a bearing ball 97 and a notch 84 through a perforation is virtually eliminated.

The thimble 98 insures that the force of spring 99 is evenly applied to the bearing ball. In addition, the expedient of a thimble permits the bearing ball to float freely by preventing the lower end of the associated spring 99 from being spread or pushed out by the bearing ball and in so doing jamming itself against the interval surface of the associated channel 95.

Of course, when there is no aperture 61 immediately beneath a bearing ball 97, that ball is prevented from engaging the notch 84 with which it is lined up. This is the case illustrated by the first and third bearing balls shown in FIGURE 13.

It has thus been shown that certain ones only of the thirty bearing balls 97 are electrically connected to their assigned slip rings 81 for the assumed setting of knob 54 and since those bearing balls are in turn electrically connected to associated ones of input conductors 21–26 it has been shown that those conductors are permutably connected to the five conductive bus bars or slip rings 81 in accordance with a permutation or innerconnection pattern established by the particular group of perforations 61 interposed between the bearing balls and the slip rings. It is necessary to transfer the electrical connections from slip rings 81 to output conductors 31–35. This is achieved by means of the five bearing balls 108 each of which is urged into a notch 84 of a respective one of the five bus bars 81. As shown in FIGURE 3, code card 57 is threaded through the switching apparatus so that it is immediately adjacent to only approximately one-half of the rotor assembly. In this way, the card is not interposed between bearing balls 108 and slip rings 81. As a consequence, for each distinct position of card 57 and the rotor assembly bearings balls 108 will register with and engage assigned notches 84 of the slip rings in the same manner as illustrated by the middle bearing ball 97 in FIGURE 13.

The five slip rings 81 will therefore be electrically connected, by way of the five bearings balls 108, their associated coil springs 107, and bus bars 111, to respective ones of output conductors 31–35. Each of input conductors 21–26 is thus permutably connected to at least one of output conductors 31–35 via an associated bus bar 101, a coil spring 99, an inverted thimble 98, a bearing ball 97 which extends through a perforation 61 of code card 57, a notch 84 of one of the slip rings 81, the bearing ball 108 engaging that slip ring, the associated coil spring 107 and bus bar 111 for that bearing ball 108 and thence to the selected one of output conductors 31–35.

In rotating the rotor assembly from one discrete position to the next, all of the bearing balls 97 and 108 that have engaged notches 84 will be expelled or forced upward against the tension of the associated coil spring by the unnotched portions of slip rings 81. In other words, the balls will be cammed out of the notches. To insure that switching apparatus 30 does not jam and that the bearing balls may be readily retracted from engagement with the notches, the notch width and diameter of the bearing balls are so proportioned and dimensioned that when a bearing ball drops into and engages a notch its downward movement will be limited by the edges of the notch to the extent that the center of the bearing ball will always lie above the notch, as shown by the middle bearing ball 97 in FIGURE 13. With this arrangement, the bearing ball may be cammed upward with little difficulty as the rotor assembly is transported from one position to the next.

While it is contemplated that successive subscription television programs will require successively higher code numbers, which would necessitate only clockwise rotation of knob 54 between programs, the rotor assembly may obviously be rotated in either direction. Hence, if a subscriber inadvertently rotates transport knob 54 too far in a clockwise direction and passes up the code number required for a given program, that code number may be reached merely by backing up the knob or rotating it in a counterclockwise direction.

To insure that bearing balls 97 do not tear or damage code card 57, the diameter of each perforation 61 preferably exceeds the diameter of each bearing ball. This is also best seen by the middle bearing ball in FIGURE 13 and the associated perforation 61. Small areas of the unnotched portions of slip ring 81 adjacent the two sharp corners of a notch are exposed through each perforation 61. Each of these small areas is referred to as "slot land." Since the edges of each perforation do not coincide with the edges of a notch, the possibility of a bearing ball damaging the code card as the ball drops in or is expelled from the notch is avoided.

To briefly summarize the illustrated switching apparatus, the five slip rings 81 effectively provide a first set of switch contacts, each having a plurality of notches 84, arranged in rows. Elements 101, 99, 98 and 97 effectively provide a second set of switch contacts, each having a plurality of aligned bearing balls 97 spring urged toward assigned respective ones of notches 84, arranged in columns. Code card 57 constitutes a multiposition, perforated insulating strip separating the first and second sets of contacts and in each position interposing a different and unique pattern of perforations between the bearings balls 97 and notches 84 to permit only predetermined ones of the bearing balls to engage their assigned notches through the perforations thereby to permutably connect the first and second sets of switch contacts. The rotor assembly, including transport knob 54, provides means for moving strip 57 from one position to another to change the permutation pattern between the first and second set of contacts. The first set of contacts 81 are electrically connected to output conductors 31–35 via bearing balls 108, springs 107 and bus bars 111, while the second set of contacts are directly connected to input conductors 21–26.

Attention will now be directed to the charge register or recording equipment contained within cabinet 50. A fixed support bracket 121 with a U-shaped cross-section has its bight portion rigidly affixed to the bottom of cabinet 50, see FIGURE 6. Another fixed support bracket 124 is rigidly mounted to and between the upright portions of bracket 121. Slideably mounted to bracket 124 is a slide bracket or carrier 126, best seen in FIGURE 7. Such a mounting arrangement is facilitated by a pair of guide studs 127, rigidly mounted to fixed bracket 124, which respectively ride in a pair of guide slots 128 in slide bracket 126. Captivation of bracket 126 is obtained by C-shaped retaining rings 129 mounted in grooves of studs 127 on top of the bracket. Bracket 126 may thus be moved in a horizontal direction, as viewed in FIGURES 3 and 5.

Slide bracket 126 has a pair of upright portions which are apertured to receive a shaft 131. Rigidly affixed to shaft 131, between the upright portions, is a series of five cam or notched discs 132. The periphery of each disc 132 is broken up into a series of irregularly spaced notches of varying width. Hence, the radius of each cam disc has one of two different values depending on where on the circumference the measurement is made. Shaft 131 extends beyond the right upright portion of slide bracket 126 (as viewed in FIGURE 6) and accommodates a ratchet 134 which is rigidly affixed to the shaft with respect to rotational movement thereof. In other words, ratchet 134 is so positioned on shaft 131 that rotational movement of the ratchet effects concurrent rotation of the shaft.

A pair of C-shaped retaining rings 135 are mounted in grooves provided in shaft 131 to captivate cam discs 132 and ratchet 134 against movement in the direction of the axis of the shaft. As viewed in FIGURE 6, one retaining ring 135 is mounted immediately to the left of left upright portion of bracket 126 while the other ring 135 is mounted immediately to the right of ratchet 134. Slide bracket 126 has a depending tab 137 (best seen in FIGURE 6) to which is rigidly mounted one end of a flexible, flat spring arresting pawl 138, the other end of which is free and positioned to engage a tooth of ratchet 134. Pawl 138 holds ratchet 134 against any counterclockwise movement, as viewed in FIGURE 3.

The portion of fixed support bracket 124 closest to the right upright portion of bracket 121 (as viewed in FIGURE 6) has a series of right angle bends and is of U-shaped cross-section to accommodate a shaft 141 which is journalled in and mounted between two apertures provided in bracket 124. This shaft is likewise captivated against axial movement by a pair of C-shaped retaining rings 142. A drive pawl 143 is rotatably mounted on shaft 141 within the U-shaped portion of bracket 124 and is positioned to engage the teeth of ratchet 134. A wire spring 146, which is coiled around shaft 141, has one of its ends hooked around pawl 143 and its other end hooked on bracket 124 in order to exert a clockwise torque, as viewed in FIGURES 3 and 5, on pawl 143. In this way, pawl 143 is urged into engagement with the periphery of ratchet 134.

A solenoid 149, which constitutes the charge solenoid discussed hereinbefore, is fixedly mounted by means of a bracket 151 to the bight portion of the U-shaped support bracket 121. Conductors 152, attached to the charge solenoid, are connected to an energizing circuit fully described in the copending Morris case, Ser. No. 169,812. Slide bracket 126 has a depending arm 153 which is attached to the plunger 154 of solenoid 149. A coil spring 155 connected between arm 153 and a depending arm 157 of fixed bracket 124, biases slide bracket 126, and the elements 131–138 mounted thereon as well as plunger 154, toward the left as viewed in FIGURE 3. That figure illustrates the relative positions of fixed bracket 124 and movable bracket 126 when solenoid 149 is de-energized. In response to energization of the solenoid, plunger 154 is pulled to the right. Arm 153 is attached to plunger 154 in such a manner that axial movement of the plunger results in movement of arm 153 and slide bracket 126. FIGURE 5 shows the relative positions of brackets 124 and 126 when solenoid 149 is actuated.

The upright portions of fixed bracket 121 are also provided with a pair of aligned apertures to accommodate and support a shaft 159, best seen in FIGURE 6. A pair of C-shaped snap washers 161 are respectively mounted in grooves of shaft 159 to captivate shaft 159 between the two upright portions of bracket 121. A series of five bellcranks 162 are rotatably mounted on shaft 159 for independent movement. A spring member 163 is affixed to bracket 121 and engages each of the five bellcranks 162 in order to bias them with a clockwise torque, as viewed in FIGURE 3. A stop pin 164, rigidly mounted to and between the upright sections of bracket 121, limits the clockwise movement of each bellcrank by the pressure of spring 163.

Each of the five bellcranks 162 is provided with an extending sensing or cam follower tab 167 and, as seen in FIGURE 6, is aligned with a respective one of the five cam discs 132. The sensing tab 167 on each bellcrank is so positioned that it senses the presence or absence of a notch on its assigned cam disc 132 in response to energization of solenoid 149, as will be explained.

An aperture is provided at the end of each bellcrank 162 to accommodate a lancing or piercing pin 169. A pair of collars 171 are mounted on each pin 169 to captivate the pin to the associated bellcrank while still permitting limited relative movement between the pin and bellcrank. Each of the five lancing pins 169 extends into and slides within an assigned one of five cylindrical guide channels 172 (see FIGURE 9) formed in stator support 93. The diameter of each channel 172 is made slightly larger than the diameter of each pin 169 to permit slideable movement of the pins with respect to their associated guide channels. Pins 169 and channels 172 are so positioned that when the rotor assembly is indexed in any one of its discrete positions, a slot 75 of the rotor core 73 registers with or lies below each of the five aligned pins 169. As shown in FIGURE 3, the length of each lancing pin 169 is such that its pointed end lies slightly above and out of engagement with code-bearing card 57.

Consideration will now be given to the operation of the charge register. Assume that a particular subscription telecast which the subscriber desires to view requires the pattern of apertures 61 designed by the code number 101 to achieve decoding and intelligible reproduction. The subscriber rotates transport knob 54 until the code number 101 appears in window 55. As briefly explained previously and in detail in the copending Morris case Ser. No. 169,812, a series of correlation tests during a ten-second interval are performed to determine whether switching apparatus 30 is appropriately adjusted for the program in question, namely to determine if the correct pattern of apertures 61 has been selected to permit input conductors 21–26 to output conductors 31–35.

Since it has been assumed that the subscriber has employed the correct code number, the correlation tests will indicate correct correlation, as a result of which the energizing circuit for charge solenoid 149 will be completed and the solenoid will actuate. In so doing, plunger 154 moves to the right (as viewed in FIGURE 3) against the tension of spring 155 causing slide bracket 126 to move toward the position shown in FIGURE 5. Inasmuch as the position of shaft 131 is fixed with respect to bracket 126, such movement of the bracket effects movement of shaft 131, ratchet 134 and cam disc 132 to the right. However, since drive pawl 143 is mounted to fixed bracket 124, movement of ratchet 134 toward the right causes a slight clockwise rotation of the ratchet which in turn causes concurrent rotation of all of discs 132 which move in unison. For reasons to become apparent, ratchet 134 should preferably have thirty-one teeth in order that discs 132 rotate only $1/31$ of a complete revolution. A different portion of the periphery of each cam disc 132 will now be adjacent the sensing tab 167 of the associated bellcrank 162.

As slide bracket 126 continues to move toward the right those discs 132 having un-notched or raised portions adjacent their associated sensing tabs 167 engage those tabs and effect counterclockwise rotation of the associated bellcranks 162 against the tension of spring 163. The lancing pin 169 attached to each actuated bellcrank is pushed toward the axis of the rotor assembly to the extent that the pin pierces a hole in card 57. This, of course, is best seen in FIGURE 5. Slots 75 are provided, of course, to receive those lancing pins 169 that are pushed through card 57.

It will be assumed that in the illustrated case only two of the five cams 132 engage their associated bellcranks with raised or un-notched sections. Hence, only two apertures are punched in card 57. It will further be assumed that the two actuated bellcranks 162 include the one shown on the extreme right and the second one from the left, as viewed in FIGURE 6. The piercing pins 169 associated with those two bellcranks will hence produce perforations 175 in the right half of card 57, as viewed in FIGURE 8. Since the position of holes 175 with respect to the length dimension of card 57 is determined by the code number displayed in window 55, that particular position is indicative of the pattern of perforations 61 employed for a given program, which pattern is unique to that program. Thus, apertures 175 indicate the identity of the program to which the subscriber has subscribed.

In accordance with the present invention, apertures 175 represent more than merely the identity of a program. They represent a charge sequence number in binary notation Specifically, since there are five discs 132, the periphery of each of which may be either notched or un-notched at any given point, the combination of the five discs facilitates the representation of thirty-one different numbers 1–31. Restricting the incremental step rotation of discs 132 to $1/31$ of 360° permits the discs to have thirty-one different positions each of which provides a representation of an assigned respective one of charge sequence numbers 1–31. An un-notched section of a disc 132 represents one in binary notation, while a notched portion represents a zero. Hence, since perforations 175 are produced by un-notched sections, they represent ones. The absence of two holes between apertures 175 and the absence of a hole immediately to the left of the left-most punch 175 represent zeros. Thus, the charge registered by the two apertures 175 represent the binary number 01001 whose decimal equivalent is 9.

De-energization of solenoid 149 permits coil spring 155 to move slide bracket 126 back to its home position as illustrated in FIGURE 3. During that movement, ratchet 134 moves to the left with respect to drive pawl 143 which is cammed out of engagement with one ratchet tooth and into engagement with the next adjacent tooth. Arresting pawl 138 prevents ratchet 134 from rotating counterclockwise.

Assume now that the next program to which the subscriber subscribes is that requiring the pattern of apertures 61 associated with code number 102. When knob 54 is rotated to display code number 102 the decoding apparatus functions to decode the telecast and charge solenoid 149 actuates. Slide 126 once again moves toward the right and all of discs 132 rotate clockwise one step ($1/31$ of 360°) in unison. The discs are so shaped that the portions of their peripheries adjacent sensing arms 167 of bellcranks 162 represent the binary number 01010, the decimal equivalent of which is ten. Hence, the two perforations 176 will be punched in the right half of card 57.

The next program viewed by the subscriber requires the perforations 61 associated with code number 107. Again solenoid 149 energizes and effects rotation of discs 132 one step and the piercing of holes in card 57 which reflect the peripheries of the discs being sensed by tabs 167. The configurations of the discs will be such that the third program viewed results in the piercing of the three perforations 177 indicative of the binary number 01011 or decimal number 11.

As revealed in FIGURE 8, six subsequent programs are subscribed to resulting in the registration of charges that represent in succession decimal numbers 12–17.

The nine separate charges recorded on card 57 thus not only reflect the identity of nine separate programs viewed by the subscriber but an unbroken sequence of nine charge numbers 9–17. When the card is turned in to the subscription television operating company a bill may be prepared based on the charges recorded on the code card. Moreover, to make certain that the subscriber has not employed a counterfeit or bootleg card to achieve the necessary interconnection pattern in switching apparatus 30 to view some programs, which card would serve as the recording medium to register the charges, the operating company can check the recorded charge sequence numbers, on the authorized card turned in, to determine if they all follow in proper sequence. Incidentally, while in the illustrated case the charge numbers follow a regular consecutive sequence, obviously this is not necessary since the numbers may follow any predetermined random pattern.

To more fully understand the manner in which any illicit activity on the part of the subscriber may be detected, assume that the subscriber employs a counterfeit card for some or all of the programs during the period covered by the code card which is to be employed subsequent to the one shown in FIGURE 8. Since the last charge number recorded on card 57 in FIGURE 8 is number 17, charge sequence numbers starting at 18 will be recorded on the unauthorized card. Of course, after charge sequence number 31 is registered cam discs 132 cycle back to their positions which result in the recording of charge sequence number 1. If the subscriber employs the unauthorized card for several programs and then uses the authorized card for one or more programs and turns in the authorized card to the operating company for billing purposes, it can easily be determined that a bootleg card has been employed. This, of course, can be detected since the first charge sequence number recorded on the authorized card should be charge number 18 and this will not be the case inasmuch as the charge sequence numbers starting at 18 are registered on the counterfeit card.

The charge register of the present invention thus records on removable code card 57 separate charges (in the form of a pattern of one or more perforations) each representing a charge sequence number as well as the identity of a particular one of the selected programs to which the subscriber subscribes. Each recorded charge has one characteristic (its position along the length dimension of the card) to indicate program identification and another characteristic (the binary representation) denoting the charge sequence number, both of the characteristics changing from one program to the next.

Punching out holes by means of piercing pins 169 to register charges very adequately accomplishes the objectives sought. As is the case with most punching or piercing devices, however, chad (cut out portions) results. Of course, it is desirable that the chad not foul up the operation of the charge register. Chadless type punches are available but they have the disadvantage that it is sometimes difficult to readily detect the holes punched. Two variations of the charge register are shown in FIGURES 14–17 in each of which readily discernible holes are pierced in a recording medium without producing any undesirable chad.

Figure 14:
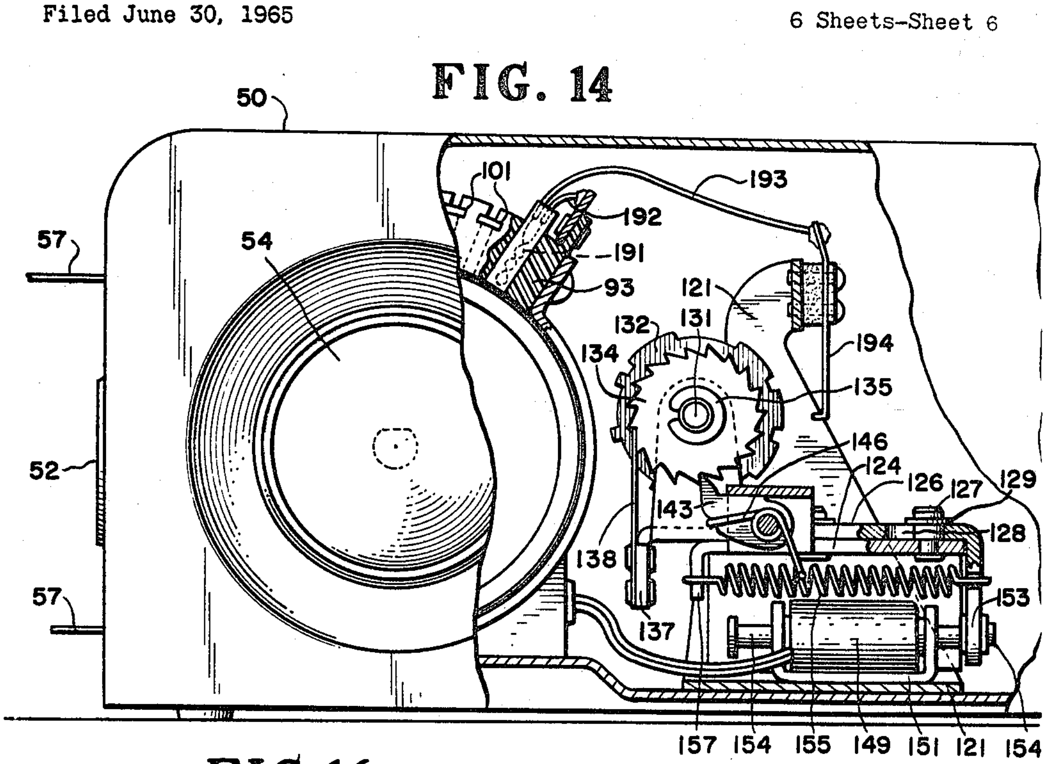
Figure 15:
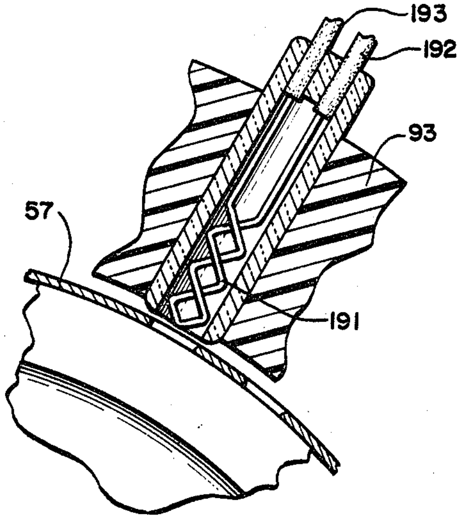
Figure 17:
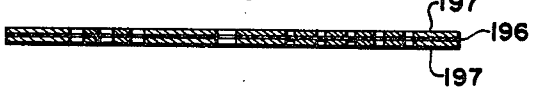

The modified charge register shown in FIGURES 14 and 15 includes many of the elements previously described, as indicated by the like reference numerals. Instead of using a series of movable bellcranks and lancing pins, the function of piercing holes in a recording medium is performed by a series of five thermal devices or heating elements 191 mounted in a fixed position within stator support 93 in approximately the same positions occupied by channels 172. One terminal of each heating element 191 is connected via a conductor 192 to a terminal of a source of energizing potential (not shown) and the other terminal of each thermal device is connected by a conductor 193 to an assigned respective one of a series of five metallic electrically conductive sensing elements 194 which are mounted to but insulated from bracket 121. Each of the sensing elements 194 lines up with an assigned one of the five discs 132. These discs are made of some appropriate electrically conductive metallic material in order that they may be constantly established at a ground potential through the other metallic members of the apparatus actuated by solenoid 149. The terminal of the energizing potential source which is not connected to each conductor 192 is grounded.

In response to energization of the solenoid and movement toward the right of each of the five discs 132 certain ones of the sensing arms 194 will be grounded, as determined by the portions of the discs adjacent the sensing arms. In other words, if a disc 132 has an un-notched or raised section adjacent the free end of the associated sensing arm 194, that arm will engage the raised portion and establish an electrical connection to ground. Grounding of a conductor 193 completes the energizing circuit for the associated thermal device 191, causing that device to heat a localized area of code card 57. Of course, card 57 should be heat sensitive in order that energization of heating element 191 heats the area of the card in juxtaposition with the heating element to the extent that an aperture is actually produced or burned out of code card 57.

As a consequence, the heat piercing arrangement of FIGURES 14 and 15 facilitates the recording of separate charges for each program in the form of holes, as in the case of the embodiment of FIGURES 2–13, which represent program identification and charge sequence. However, there is no chad. Moreover, the system of FIGURES 14 and 15 requires fewer movable parts than that of the first described arrangement. Specifically, the function performed by movable pins 169 and bellcranks 162 is served by fixed elements 194 and 191.

In brief, the embodiment of FIGURES 14 and 15 illustrates recording apparatus for registering information on a heat sensitive recording medium 57. Each thermal device 191 responds to a predetermined energization for selectively heating a localized area of the recording medium.

Burning perforations in card 57 has the disadvantage that ash may result along with fumes which may conceivably contaminate electrical contacts within the subscription television receiver. Such a disadvantage is eliminated by means of the laminated strip 198 shown in FIGURES 16 and 17 and which is adapted to be used in the charge register shown by FIGURES 14 and 15. The recording medium itself takes the form of a thin film or sheet of pre-stressed, heat-shrinkable material 196, such as polyethylene. In the illustrated embodiment, the heat-shrinkable material 196 is flaccid and laminated between two self-supporting laminations 197 which may be made of cardboard.

Figure 16:
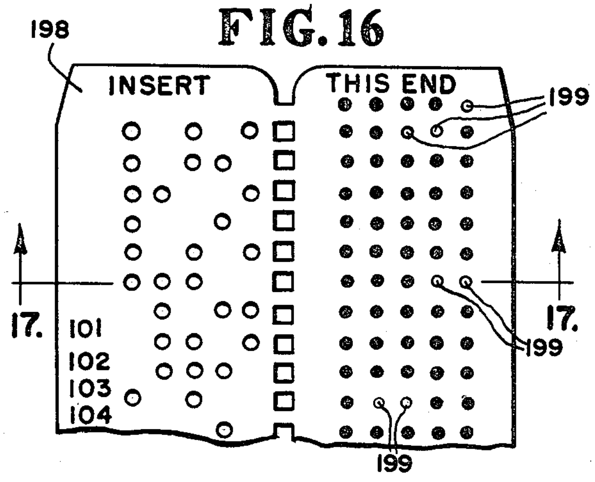

The left half of laminated strip 198, as viewed in FIGURE 16, includes perforations that extend through all three laminations or layers and correspond to perforations 61 of the code card of FIGURE 8. In the right half of strip 198, aligned holes are pre-cut or pre-punched in both laminations 197 and these apertures are positioned so that they will be selectively placed in juxtaposition with the five heating elements 191. Before any recording occurs, thin film 196 of heat-shrinkable material is continuous and extends across all of the perforations pre-punched in laminations 197. Whenever an area of film 196, defined by a pair of aligned perforations in laminations 197, is heated by a heating device 191 an aperture will be developed in that area.

Specifically, heat from the thermal device 191 causes the thin film 196 to open since the molecules in the thin film are under stress and would be permitted to relax. The flow in the thin film would thereby cause an opening. However, no ash or fumes are produced. Reference numbers 199 designate the areas of thin film 196 that have been heat pierced. All of the blackened or filled in circles in the right half of card 198 in FIGURE 16 illustrate localized areas of film 196, exposed through the pre-punched apertures of the top lamination 197, that have not been subjected to the restricted-area heating of a thermal device 191.

Laminations 197 not only serve as a support for flaccid thin film 196, but in addition the pre-punched perforations in the laminations confine the size of the aperture produced by the heating elements. The laminations provide a heat shield to prevent undue enlargement of a single hole.

Hence, thin film 196 provides a recording medium including a thin sheet of pre-stressed, heat-shrinkable material predetermined localized areas of which are adapted to be placed, one at a time, in juxtaposition with the restricted-area heating elements 191. Laminations 197 maintain portions of recording medium 196, outside the predetermined areas, in fixed space relation with the heating elements. Energization of the heating elements 191 produce apertures in heat-shrinkable material 196 within the predetermined areas.

Certain features described in the present application are disclosed and claimed in the following copending applications filed concurrently herewith: Ser. Nos. 468,484, in the name of Emil C. Walker; 468,493, in the name of James C. Gaudio; and 468,492, in the name of Erwin M. Roschke, and which issued May 9, 1967 as Patent 3,319,-257, all of which are assigned to the present assignee.

While particular embodiments of the invention have been shown and described, modifications may be made, and it is intended in the appended claims to cover all such modifications as may fall within the true spirit and scope of the invention.

I claim:

1. A subscription television receiver to which is transmitted television signals for a multiplicity of different television programs, and wherein charges are to be registered on a removable element only for those selected programs to which the subscriber actually subscribes, comprising:

means for recording on said removable element separate charges each representing a charge sequence number and identifying a particular one of said selected programs;

and means for changing the charge sequence number from one of said selected programs to the next in order to record program identification and also charge sequence.

2. A subscription television receiver to which is transmitted television signals for a multiplicity of different subscription television programs, and wherein charges are to be registered on a removable element only for those selected programs to which the subscriber actually subscribes, comprising:

means for recording on said removable element separate charges each representing a charge sequence number and identifying a particular one of said selected programs;

and means for sequentially changing a characteristic of said separate recorded charges from one of said selected programs to the next to represent different charge sequence numbers in order to record program identification and also charge sequence.

3. A subscription television receiver to which is transmitted television signals for a multiplicity of different subscription television programs, and wherein charges are to be registered on a removable element only for those selected programs to which the subscriber actually subscribes, comprising:

an adjustable apparatus to be positioned by the subscriber before each of said selected subscription television programs may be intelligibly reproduced;

means responsive to adjustment of said adjustable apparatus for recording on said removable element separate charges each representing a charge sequence number as well as the identity of a particular one of said selected programs;

and means for sequentially changing a characteristic of said separate recorded charges from one of said selected programs to the next in accordance with a predetermined sequence to represent different charge sequence numbers in order that each recorded charge indicates not only program identification but also charge sequence.

4. A subscription television receiver to which is transmitted television signals for a multiplicity of different subscription television programs, and wherein charges are to be registered on a removable element only for those selected programs to which the subscriber actually subscribes comprising:

an adjustable apparatus to be positioned by the subscriber before each of said selected television programs may be intelligibly reproduced;

and means responsive to adjustment of said adjustable apparatus for recording on said removable element separate charges for said selected programs, each recorded charge having one characteristic to indicate the identity of a particular one of said selected programs and another characteristic, representing a charge sequence number which changes from one program to the next, to indicate charge sequence.

5. A subscription television receiver to which is transmitted television signals for a multiplicity of different subscription television programs, and wherein charges are to be assessed for only those selected programs to which the subscriber actually subscribes, comprising:

an adjustable apparatus to be positioned by the subscriber before each of said selected subscription programs may be intelligibly reproduced;

a charge register including a removable element on which charges are to be recorded only for said selected programs;

and means responsive to adjustment of said adjustable apparatus for actuating said charge register to record on said removable element separate charges for said selected programs, each recorded charge having one characteristic to indicate the identity of a particular one of said selected programs and another characteristic representing a charge sequence number which changes from one program to the next.

6. A subscription television receiver to which is transmitted television signals for a multiplicity of different subscription television programs, and wherein charges are to be assessed for only those selected programs to which the subscriber actually subscribes, comprising:

an adjustable apparatus to be positioned by the subscriber before each of said selected subscription television programs may be intelligibly reproduced;

a charge register including a removable element on which charges are to be recorded only for said selected programs;

means coupled to said adjustable apparatus for actuating said charge register to record on said removable element separate charges each representing the identity of a particular one of said selected program;

and means included in said charge register for sequentially changing a characteristic of said separate recorded charges from one of said selected programs to the next in accordance with a predetermined sequence in order that each recorded charge indicates not only program identification but also charge sequence.

7. A subscription television receiver to which is transmitted television signals for a multiplicity of different subscription television programs, and wherein charges are to be registered on a removable element only for those selected programs to which the subscriber actually subscribes, comprising:

means for recording on said removable element separate charges each in the form of a pattern of apertures representing a charge sequence number as well as the identity of a particular one of said selected programs;

and means for determining the pattern of apertures from one of said selected programs to the next to represent different charge sequence numbers in order that each recorded charge indicates not only program identification but also charge sequence.

8. A subscription television receiver to which is transmitted television signals for a multiplicity of different subscription television programs, and wherein charges are to be registered on a removable element only for those selected programs to which the subscriber actually subscribes, comprising:

means for recording on said removable element separate charges each representing in binary notation a charge sequence number as well as the identity of a particular one of said selected programs;

and means for changing the charge sequence number from one of said selected programs to the next in order to record program identification and also charge sequence.

9. A subscription television receiver to which is transmitted coded television signals for a multiplicity of different subscription television programs, and wherein a removable code-bearing element containing code information is employed to decode said multiplicity of programs, and in which charges are to be assessed for only those selected programs to which the subscriber actually subscribes, comprising:

decoding apparatus which must be provided with predetermined and different code information for each program before the coded television signal for that program may be intelligibly reproduced;

sensing means included in said decoding apparatus and controlled by the subscriber for selectively deriving the code information from said code-bearing element for each of said selected programs to effect intelligible reproduction of said selected programs;

means for recording on said removable code-bearing element separate charges each representing a charge sequence number and identifying a particular one of said selected programs;

and means for sequentially changing a characteristic of said separate recorded charges from one of said selected programs to the next to represent different charge sequence numbers in order to record program identification and also charge sequence.

10. A subscription television receiver to which is transmitted television signals for a multiplicity of different subscription television programs, and wherein charges are to be assessed for only those selected programs to which the subscriber actually subscribes, comprising:

an adjustable code-determining apparatus including an elongated and movable strip, the position of which determines the condition of adjustment of said apparatus and which is to be established in a different predetermined position to effect intelligible reproduction of each of said selected programs;

means, to be manipulated by the subscriber, for controlling the position of said strip;

means for recording on said strip separate charges each representing a charge sequence number as well as the identity of a particular one of said selected programs;

and means for sequentially changing a characteristic of said separate recorded charges from one of said selected programs to the next to represent different charge sequence numbers in order that each recorded charge indicates not only program identification but also charge sequence.

11. A subscription television receiver to which is transmitted television signals for a multiplicity of different subscription television programs, and wherein charges are to be assessed for only those selected programs to which the subscriber actually subscribes, comprising:

an adjustable code-determining apparatus including a multi-position, perforated card presenting in each position a different pattern of perforations and a plurality of elements for sensing perforations in said card and which is to be established in a different predetermined position to effect intelligible reproduction of each of said selected programs;

means, to be manipulated by the subscriber, for controlling the position of said card;

means for making a pattern of apertures in said card to record each separate charge, the pattern representing a charge sequence number as well as the identity of a particular one of said selected programs;

and means for sequentially changing the pattern of apertures from one of said selected programs to the next to represent different charge sequence numbers in order that each recorded charge indicates not only program identification but also charge sequence.

12. A subscription television receiver to which is transmitted television signals for a multiplicity of different subscription television programs, and wherein charges are to be registered on a removable element only for those selected programs to which the subscriber actually subscribes, comprising:

a series of piercing devices each of which, when actuated, perforates said removable element;

means for actuating a different and unique combination of said piercing devices for each of said selected programs to record separate charges for said selected programs in the form of different patterns of apertures, each pattern representing a charge sequence number as well as the identity of a particular one of said selected programs;

and means for changing the particular combination of piercing devices employed from one of said selected programs to the next in order that the recorded charges will represent different charge sequence numbers.

13. A subscription television receiver to which is transmitted television signals for a multiplicity of different subscription programs, and wherein charges are to be assessed for only those selected programs to which the subscriber actually subscribes, comprising:

an adjustable apparatus to be positioned by the subscriber before each of said selected subscription television programs may be intelligibly reproduced;

a charge register including a strip on which charges are to be recorded only for said selected programs, a series of piercing devices each of which, when actuated, perforates said strip, and a series of cam elements for controlling the selective actuation of said piercing devices;

means coupled to said adjustable apparatus and including said cam elements for actuating a different and unique combination of said piercing devices for each of said selected programs to record separate charges for said selected programs in the form of different patterns of apertures, each pattern representing a charge sequence number as well as the identity of a particular one of said selected programs;

and means for sequentially repositioning said cam elements from one of said selected programs to the next in order that the recorded charges will represent different charge sequence numbers.

14. A subscription television receiver to which is transmitted coded television signals for a multiplicity of different subscription television programs, and wherein a plurality of removable code-bearing elements, each of which contains code information for at least one program, are employed one at a time to decode said multiplicity of programs, and in which charges are to be assessed for those programs utilized by the subscriber, comprising:

decoding apparatus which must be provided with predetermined and different code information for each program before the coded television signal for that program may be intelligibly reproduced;

sensing means included in said decoding apparatus for deriving the code information from each of said code-bearing elements to effect intelligible reproduction of said multiplicity of programs;

and means for recording, on each of said code-bearing elements, use information having a characteristic that changes from one code-bearing element to the next to indicate use sequence.

15. A subscription television receiver to which is transmitted coded television signals for a multiplicity of different subscription television programs and wherein charges are to be assessed for those programs utilized by the subscriber, comprising:

decoding apparatus which must be provided with predetermined and different code information for each program before the coded television signal for that program may be decoded and intelligibly reproduced;

a removable code-bearing element containing the required code information for at least one of said programs;

sensing means included in said decoding apparatus for deriving the code information from said code-bearing element to effect intelligible reproduction of at least said one program;

and means for recording, on said code-bearing element, use information having one characteristic which indicates that the subscriber has utilized at least said one program and having another characteristic which indicates use sequence.

References Cited

UNITED STATES PATENTS

| | | | |
|---|---|---|---|
| 2,977,434 | 3/1961 | Shanahan | 178—5.1 |
| 3,051,775 | 8/1962 | Novak | 178—5.1 |
| 3,070,652 | 12/1962 | Banning | 178—5.1 |

ROBERT L. GRIFFEN, Primary Examiner

H. W. BRITTON, Assistant Examiner

U.S. Cl. X.R.

346—37